United States Patent
Haab et al.

(10) Patent No.: US 7,748,178 B2
(45) Date of Patent: Jul. 6, 2010

(54) DEVICE FOR HOLDING PANELS AND SEPARATION ELEMENT

(75) Inventors: Gregor Haab, Baar (CH); Stefan Hagger, Boppelsen (CH)

(73) Assignee: Hawa AG, Mettmenstetten (CH)

( * ) Notice: Subject to any disclaimer, the term of this patent is extended or adjusted under 35 U.S.C. 154(b) by 186 days.

(21) Appl. No.: 11/875,858

(22) Filed: Oct. 20, 2007

(65) Prior Publication Data

US 2008/0092464 A1    Apr. 24, 2008

(51) Int. Cl.
*E06B 3/988* (2006.01)

(52) U.S. Cl. ................ 52/204.7; 52/208; 52/787.1; 403/388

(58) Field of Classification Search ........... 52/204.53, 52/204.54, 204.7, 207, 208, 459, 461, 464, 52/470, 471, 762, 787.1, 788.1; 403/367, 403/388, 409.1

See application file for complete search history.

(56) References Cited

U.S. PATENT DOCUMENTS

| | | | | |
|---|---|---|---|---|
| 3,006,443 A | * | 10/1961 | Siler | 403/408.1 |
| 5,104,141 A | * | 4/1992 | Grove et al. | 280/86.753 |
| 5,449,243 A | * | 9/1995 | Haab et al. | 403/409.1 |
| 5,497,586 A | * | 3/1996 | Dodd et al. | 52/172 |
| 5,540,514 A | * | 7/1996 | Demars et al. | 403/388 |
| 5,553,422 A | * | 9/1996 | Gazaway | 52/204.53 |
| 5,713,167 A | * | 2/1998 | Durham et al. | 52/204.54 |
| 6,131,346 A | * | 10/2000 | Kordes | 52/235 |
| 6,158,177 A | * | 12/2000 | Blobaum | 52/208 |
| 6,430,894 B1 | * | 8/2002 | Chae et al. | 52/786.1 |
| 7,455,471 B2 | * | 11/2008 | Gawehn | 403/374.4 |
| 2001/0023562 A1 | * | 9/2001 | Blobaum et al. | 52/235 |
| 2006/0039749 A1 | * | 2/2006 | Gawehn | 403/367 |
| 2006/0134377 A1 | * | 6/2006 | Ernewein et al. | 428/137 |

FOREIGN PATENT DOCUMENTS

| | | |
|---|---|---|
| EP | 0 586840 A1 | 7/1993 |
| WO | WO 98/59140 A1 | 12/1998 |

* cited by examiner

*Primary Examiner*—Richard E Chilcot, Jr.
*Assistant Examiner*—Theodore Adamos
(74) *Attorney, Agent, or Firm*—Shalom Wertsberger; Saltamar Innovations

(57) ABSTRACT

The device which serves for the adjustable mounting of a panel (1) to a frame element (5) provided with a lower assembly profile (51) comprises an anchoring bolt (4) serving to hold the panel (1) which comprises anchoring pins (42) on both sides which are held in grooves which lie opposite each other within the assembly profile (51). The panel consists of two glass panels (1*a*, 1*b*) connected to each other which comprise at least two recesses (11*a*, 11*b*) corresponding to each other, in which preferably cylindrical, outer eccentric elements (2*a*, 2*b*) are held preferably in a clearance-free way, which comprise eccentrically arranged, preferably cylindrical openings (21*a*, 21*b*) which are orientated concentrically with each other after assembly and preferably hold the introduced shaft (31) of an inner eccentric element (3) in a clearance-free way, which shaft (31) comprises an eccentrically arranged, preferably cylindrical opening (311), in which the anchoring bolt (4) is held.

13 Claims, 3 Drawing Sheets

DEVICE FOR HOLDING PANELS AND SEPARATION ELEMENT

FIELD OF THE INVENTION

The invention relates to a device for holding panels, particularly glass panels, and to a separation element provided with this device and a panel which is guided possibly by a carriage in a rail.

BACKGROUND

Separation elements, such as sliding elements, sliding doors or roller shutters, are often used to divide rooms or to close room openings or window openings. Separation elements, which often comprise a glass panel, may fixedly be mounted or fixed to carriages which can be displaced along a rail and possibly mounted so as to be rotatable.

A device for holding glass panels is known for example from [1], WO 98/59140 A1, wherein two mounting parts to be introduced into a recess in a glass panel can be connected to each other with a connecting part which can be guided through a hole provided in the glass panel and thus holding the glass panel in a positively locking way. The glass panel can thereby be adjusted with an eccentric adjuster which is introduced into the hole. Inaccuracies which have arisen during the machining of the glass panel can thereby be compensated for. An adjustable connecting screw is held between the two parts of the device, within the recess of the glass panel, the connecting screw being connected to a carriage guided in a running rail.

A further device for holding a glass panel is known from [2], EP 0 586840 A1. For the adjustable mounting of the glass panel in a receiving groove of an upper frame batten the glass panel comprises circular holes for example in the vicinity of the two ends of the top region, through which circular holes mounting elements are passed. Each mounting element consists of an anchor with a shell surface which is approximately cylindrically symmetrical about an adjusting axis. The shell surface meshes with an inner surface of a holder placed on the anchor. The anchor engages with axially projecting anchoring pins into continuous anchoring grooves arranged laterally in the receiving groove. The edge of the hole in the glass panel contacts the holder on an outer contact surface which is rotationally symmetrical about an eccentric axis parallel to the adjusting axis and spaced apart from it by an eccentricity. The holder can be drawn away from the anchor and, rotated by a multiple of an increment about the adjusting axis, be placed on the anchor again, whereby the vertical position of the contact surface in relation to the anchor and hence the position of the glass panel in relation to the frame batten changes.

The devices known from [1] and [2] are suitable for the assembly of single-layer glass panels which have considerable disadvantages in comparison with composite safety glass. On the one hand there is a risk of falling and also a risk of glass breakage and, on account of the released glass splinters, a notable risk of injury.

Composite safety glass, with which the above-described disadvantages are avoided, consists of two or more glass panels which are connected to each other by an intermediate layer (PVB films) lying therebetween. The intermediate layer is tear-resistant and viscously elastic. If, upon overloading of the multi-layer panel through stop and impact, the glass breaks, resulting fragments remain, stuck to the film (a "spider web" cracking forms). The opening remains closed and the view is extensively maintained.

Composite safety glass has further advantages. The integrated films can be graphically formed and used as advertising or information areas. For this, coloured or printed films can be incorporated between the glass panels which reliably protect the film. In addition, when using clear glass and clear films, transparency is scarcely impaired.

A disadvantage with composite safety glass, however, is that it can hardly be mounted with the known mounting devices, for example the devices known from [1] and [2].

It should thereby be taken into consideration that the two glass panels of the composite safety glass are normally pre-manufactured and then connected to each other by the film. The holes or recesses in the glass panels do not usually lie, after connection thereof, concentrically over each other due to manufacturing tolerances. The arising deviations horizontally and vertically typically lie in the region of maximum 2 mm.

Insofar as the composite safety glass is to be held by a cylindrical element, it must be selected to be smaller than the diameter of the holes or recesses, so that an disturbing clearance arises. Furthermore, in most cases, only one of the two glass panels lies on the cylindrical element, so that a high load upon only one of the glass panels results within only one of the recesses. Furthermore, the adjustment cannot be easily carried out.

It is thus an object of the present invention to provide a device, by which a composite glass panel, possibly a composite safety glass panel, formed by two glass panels connected to each other can be mounted in a frame element which is possibly connected to a carriage guided in a rail while avoiding the above-described disadvantages.

In particular, a device is provided, by which the two glass panels of the composite glass panel and thus the composite glass panel itself can be mounted in a clearance-free way.

Furthermore, a device is provided, wherein the forces acting locally on the two glass panels of the composite glass panel are evenly distributed and are as small as possible.

Furthermore, a separation element is provided which comprises a composite glass panel connected to a frame element.

SUMMARY

The device, which serves for the adjustable mounting of a panel to a frame element that is provided with a lower assembly profile, comprises an anchoring bolt serving to hold the panel. The anchoring bolt has anchoring pins on both sides which are held in grooves which lie opposite each other within the assembly profile.

The panel comprises two glass panels coupled to each other. The two glass panels each having at least two corresponding recesses in an approximate registration relative to each other. Cylindrical outer eccentric elements are disposed with minimal clearance in each of the recesses. The outer eccentric elements each have a cylindrical opening, which are oriented into concentric registration during assembly, so as to allow the introduction of a shaft of an inner eccentric element, through the openings. The shaft of the inner eccentric element having an eccentric cylindrical opening, dimensioned to receive the anchoring bolt.

After the assembly, the force acting on the anchoring bolt is transferred via the inner eccentric element evenly to the two outer eccentric elements and the two glass panels, so that minimal loads on the device parts and the glass panels result.

Through rotation of the inner eccentric element, the distance of the anchoring bolt from the frame element and hence the height of the panel can be easily adjusted. In this connection the inner eccentric element preferably comprises a coupling element, for example a polygonal nut provided on one side of the shaft which is grasped and turned with an adjusting tool. For this process, the panel is preferably slightly raised to relieve the forces acting on the panel. Alternatively, the adjustment can be carried out before the panel is hung.

In a further preferred embodiment the central part of the anchoring bolt is provided with grooves or teeth which preferably engage, only when there is a load upon the panel, in grooves or teeth which are provided within the opening in the shaft of the inner eccentric element. The inner eccentric element is thus held under a load by the anchoring bolt which preferably comprises anchoring pins on both sides. The anchoring pins are upwardly and/or downwardly defined by two parallel sliding surfaces and thus held in a rotationally secure way in the grooves provided in the frame element.

The device according to the preferred embodiment has numerous advantages. Multi-layer glass panels can be simply, quickly and precisely mounted and rapidly adjusted. A positively locking, stable and practically clearance-free connection results between the glass panel and the metal support profile or the frame element, which metal support profile is normally connected to carriages, guided so as to be displaceable in rails.

The above-described advantages of composite safety glass are integrated into the separation element. The films integrated into the composite safety glasses can be formed as desired.

BRIEF DESCRIPTION OF THE DRAWINGS

The invention is explained in greater detail below with the aid of drawings, in which.

DETAILED DESCRIPTION

Figure 1:
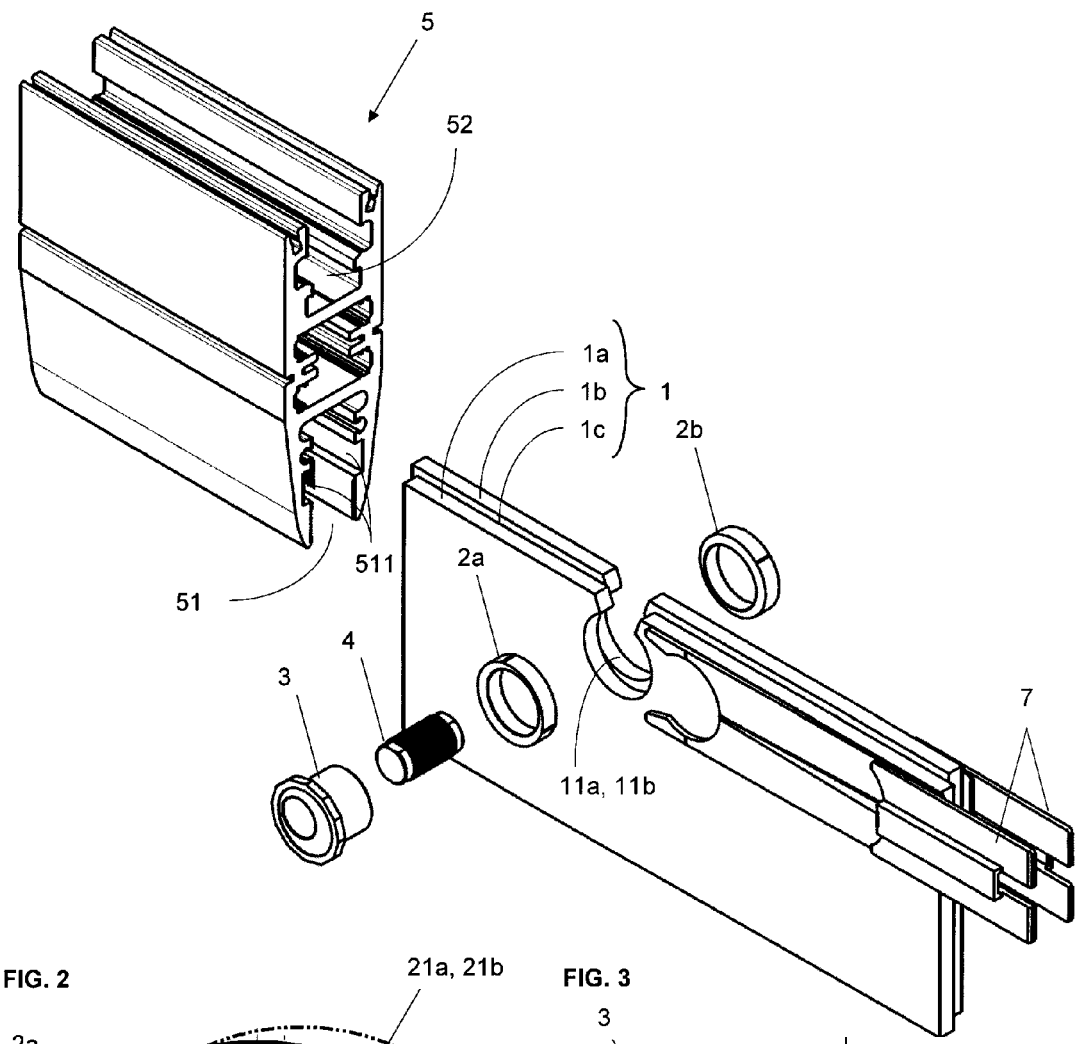
FIG. 1 shows a device according to the preferred embodiment, with two outer eccentric elements 2a and 2b which can be respectively introduced into openings 11a, 11b of glass panels 1a, 1b of a composite glass panel 1. Outer eccentric elements 2a and 2b each have an eccentrically arranged opening 21a and 21b, into which the shaft 31 of an inner eccentric element 3 can be introduced. Inner eccentric element 3 has a polygonal nut, and comprises an eccentrically arranged opening 311, in which an anchoring bolt 4 is mounted The bolt may be connected to the frame element.

FIG. 1 shows a device according to the preferred embodiment, with two outer eccentric elements 2a and 2b which can be inserted into openings 11a, 11b of glass panels 1a, 1b of a composite glass panel 1. The outer eccentric elements are disposed towards each other and are held in the recesses in a preferably clearance-free way. The eccentric elements 2a and 2b each have an eccentrically arranged opening 21a or 21b, into which the shaft 31 of an inner eccentric element 3 can be introduced. After the insertion of the eccentric elements 2a and 2b they are rotated as needed relative to each other until their openings 21a, 21b are concentrically arranged in registration, and are ready to receive the shaft 31 of the inner eccentric element 3. Inner eccentric element 3 is provided with a polygonal nut 32. Inner eccentric element 3 further comprises an eccentrically arranged opening 311, into which an anchoring bolt 4 may be introduced. Anchoring bolt 4 may couple the frame element 5. After the introduction of the described device parts 2a, 2b, 3 and 4, they are held in the openings 11a, 11b of the two glass panels 1a, 1b in a shape-locking and preferably clearance-free manner.

Figure 2:
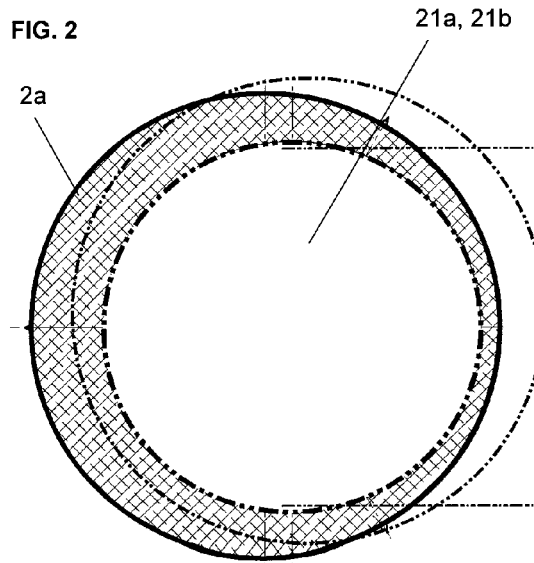
FIG. 2 shows the outer eccentric elements 2a and 2b of FIG. 1.

FIG. 2 shows the cylindrical outer eccentric elements 2a and 2b of FIG. 1.

Figure 3:
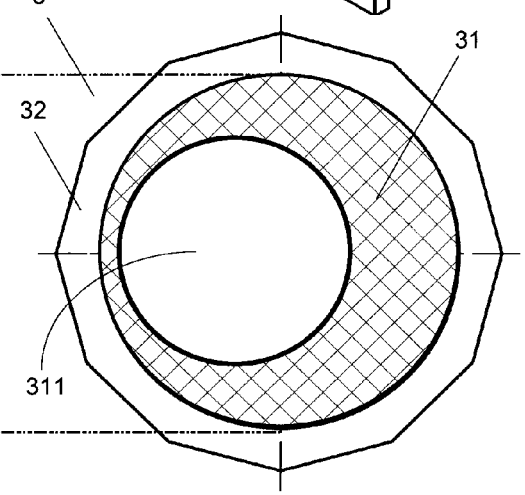
FIG. 3 shows the inner eccentric element 3 of FIG. 1.

FIG. 3 shows the inner eccentric element 3 of FIG. 1.

Figure 4:
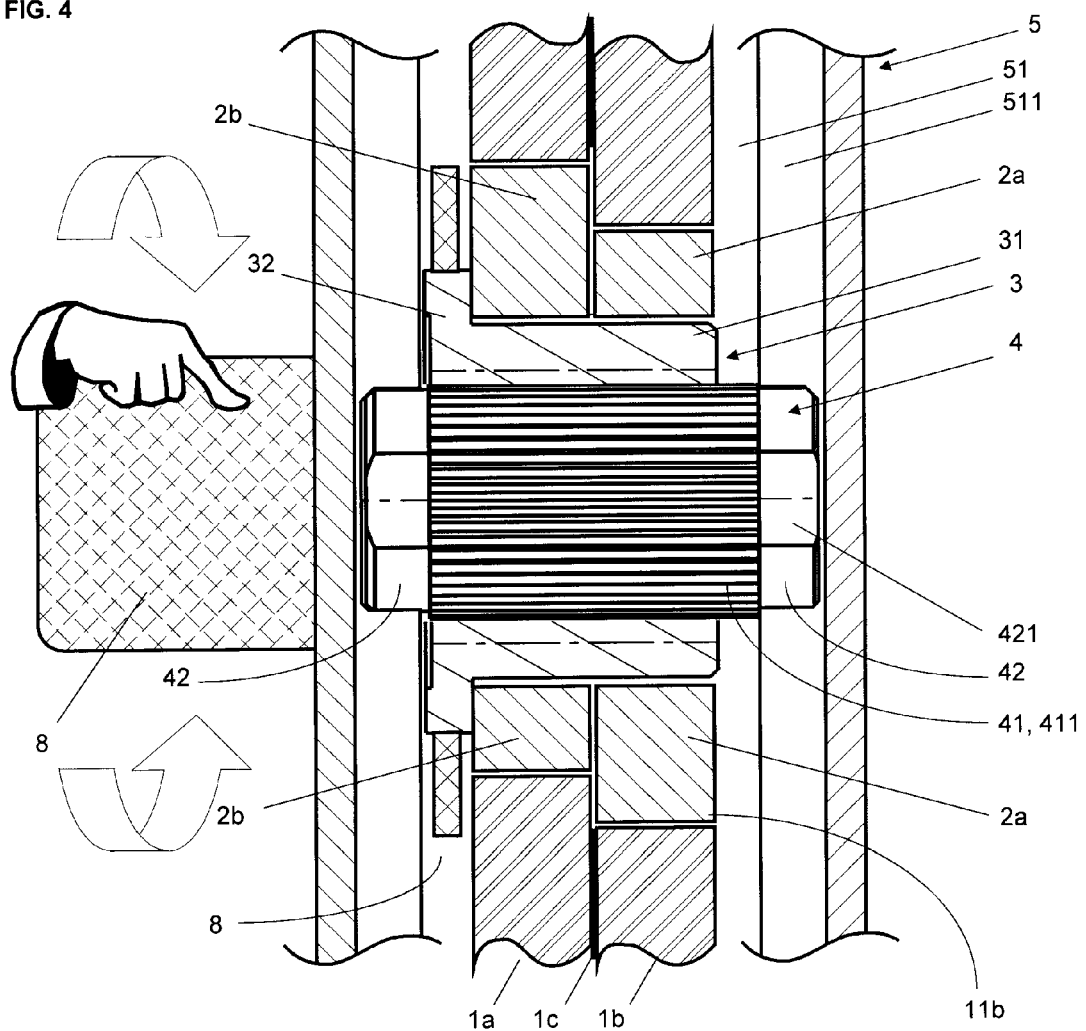
FIG. 4 shows a section through the device of FIG. 1 mounted in a frame element 5. The device can be manually adjusted with a tool 8.

FIG. 4 shows a section through the device of FIG. 1 mounted in a frame element 5. The device is manually adjusted by tool 8. It can be seen that the two outer eccentric elements 2a, 2b are held in a practically clearance-free manner in the openings 11a, 11b. The shaft 31 of the inner eccentric element 3 on the other hand is held preferably with a clearance in the openings 21a, 21b of the outer eccentric elements 2a, 2b, which allows the adjustment or rotation of the inner eccentric element 3, for example by the tool 8, if the load of the panel 1 is removed.

Figure 5A:
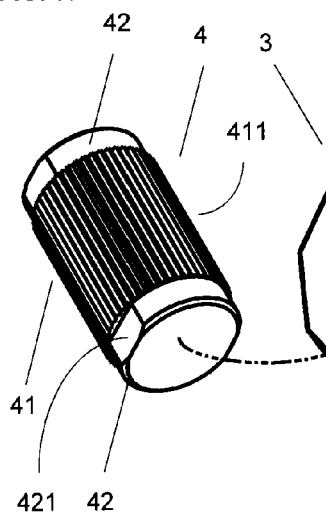
FIG. 5a shows, the anchoring bolt 4 of FIG. 1 in a perspective view. The anchoring bolt comprises a central part 41 provided with longitudinal grooves 411 or teeth, and further comprises two anchoring pins 42 each having sliding surfaces 421 which can be introduced into grooves 511 of the frame element 5.

FIG. 5a shows a perspective view of the anchoring bolt 4 of FIG. 1 which comprises a central part 41 provided with longitudinal grooves 411 or teeth. Anchoring bolt 4 further comprises two anchoring pins 42 provided with sliding surfaces 421 which can be introduced into grooves 511 of the frame element 5.

Figure 5B:
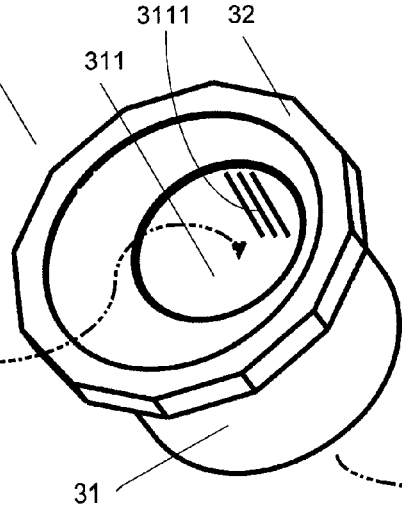
FIG. 5b shows a perspective view of the inner eccentric element 3 of FIG. 1, of which the shaft 31 corresponds to the openings 21a, 21b of the outer eccentric elements 2a, 2b. The inner eccentric element 3 is provided with an opening 311 with grooves 3111 or teeth, for holding the inserted anchoring bolt 4 in a rotationally secure manner as soon as load is applied to the panel 4.

FIG. 5b shows a perspective view of the inner eccentric element 3 of FIG. 1, of which the shaft 31 corresponds to the openings 21a, 21b of the outer eccentric elements 2a, 2b. Inner eccentric element 3 is provided with an opening 311 having grooves 3111 or teeth (not shown), for holding the inserted anchoring element 4 in a rotationally secure manner as soon as a load is applied to the panel 4. The grooves 3111 provided in the opening 311 thereby cooperate with longitudinal grooves 411 or teeth on the central part 41 of the anchoring element 4. The grooves 3111 can thereby be provided in the opening 311 during the production of the eccentric element 3 or only be incorporated after assembly of the anchoring element 4 through its longitudinal grooves 411.

Figure 5C:
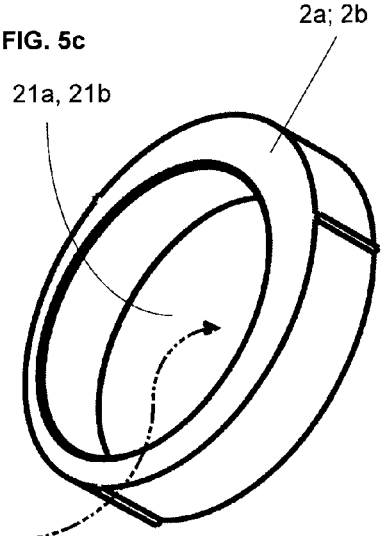
FIG. 5c shows, a perspective view of an outer eccentric element 2a; 2b according to FIG. 1.

FIG. 5c shows a perspective view of an external eccentric element 2a; 2b according to FIG. 1.

Figure 6:
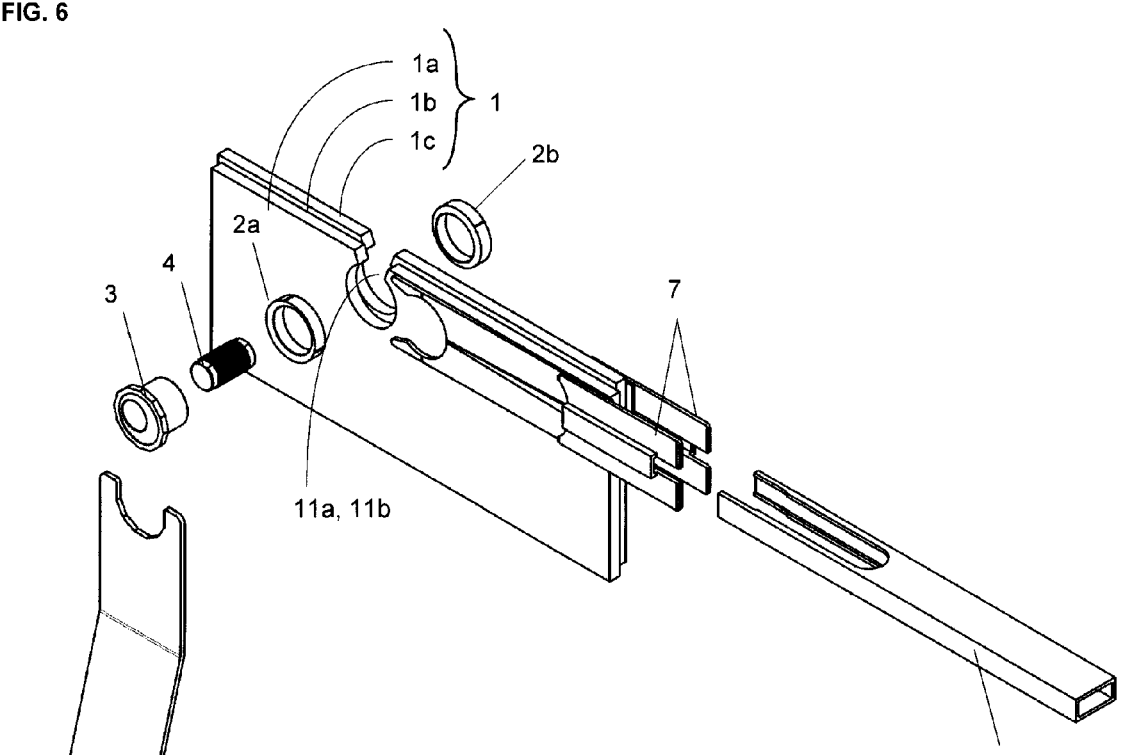
FIG. 6 shows the device of FIG. 1 with the adjusting tool 8 and two wedges 7 which can be introduced by tool 9. Utilizing the wedges 7, the lateral clearance between the composite glass panel 1 and the frame element 5 is compensated.

FIG. 6 shows the device of FIG. 1 with the adjusting tool 8 and two wedges 7 which can be introduced by tool 9. Utilizing the wedges 7, the lateral clearance between the composite glass panel 1 and the frame element 5 is compensated.

Figure 7:
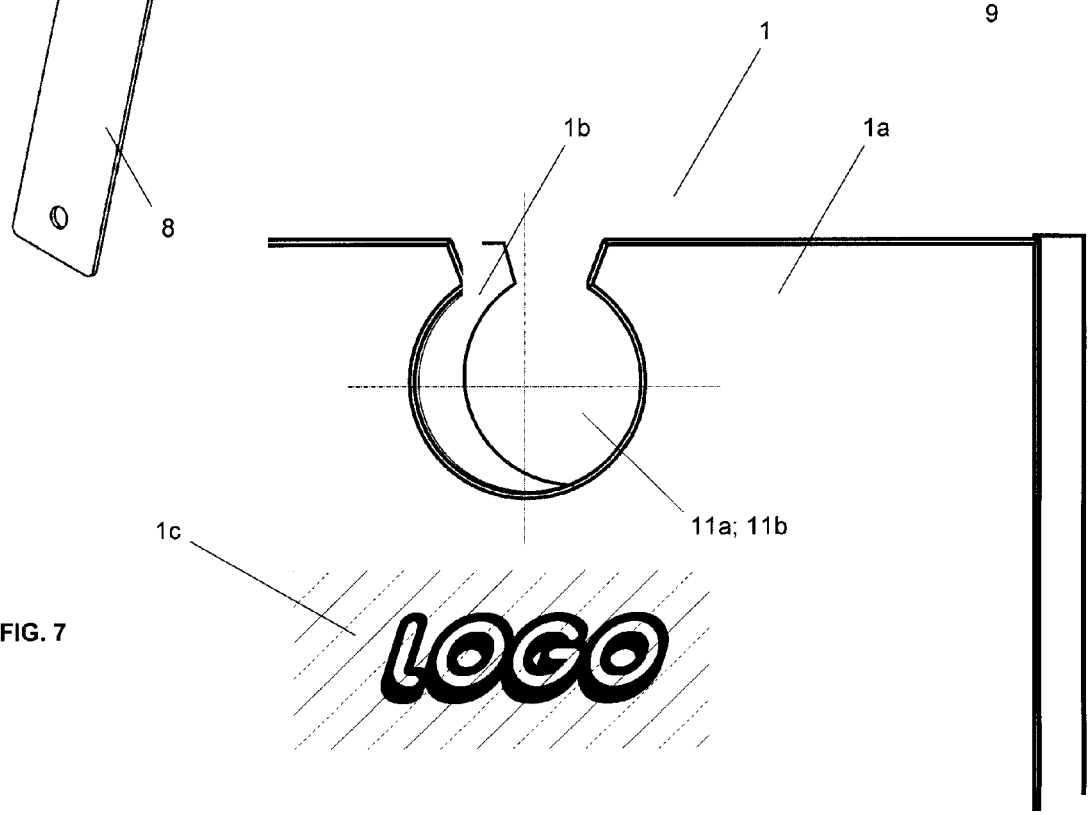
FIG. 7 shows a part of the composite glass panel 1 of FIG. 1 with the partially overlapping recesses 11a and 11b of the glass panels 1a, 1b which are connected to each other enclosing a film 1c, on which a graphic representation (logo) is provided.

FIG. 7 shows a part of the composite glass panel of FIG. 1, with the partially overlapping recesses 11a and 11b of the glass panels 1, 1b which are connected to each other enclosing a film 1c, on which a graphic representation (logo) is provided.

A panel 1 is preferably mounted as follows.

The panel 1 is horizontally mounted on support elements. The outer eccentric elements 2a, 2b are then pressed into the openings 11a, 11b which have at least a little clearance. The openings 21a, 21b provided in the outer eccentric elements 2a, 2b are now orientated. The shaft 31 of the inner eccentric element 3 is then introduced into the openings 21a, 21b. The anchoring bolt is inserted into the inner eccentric element 3. The frame profile or the frame element is then pushed so that the anchoring pins 42 are introduced into the grooves 511. Subsequently, an adjustment is performed. Furthermore, the wedges 7 are introduced. The same procedure takes place on the other side of the panel.

If wedges have been introduced into both frame elements and the latter have also been centred laterally in relation to the vertical glass edge, the joints between the frame element or the glass support profile and the mounted panel are sealed on both sides with silicone.

LIST OF REFERENCE NUMERALS

1 Composite glass panel, in particular composite safety glass
1a, 1b Glass panels
1c Preferably provided film between the glass panels 1a, 1b
11a, 11b Recesses of the glass panels 1a, 1b
2a, 2b Outer eccentric elements
21a, 21b Openings or bores in the outer eccentric elements
3 Inner eccentric element
31 Shaft of the inner eccentric element 3
311 Opening or bore in the shaft
3111 Grooves 3111 or teeth on the shaft 31
32 Coupling element or polygonal nut of the inner eccentric element 3
4 Anchoring bolt
41 Central part of the anchoring bolt 4
411 Longitudinal grooves 411 or teeth on the central part 41
42 Anchoring pin 42 of the anchoring bolt 4
421 Sliding surfaces 421 of the anchoring pins 42
5 Frame element
51 Lower assembly profile in the frame element 5 for receiving the panel 1
511 Grooves 511 in the lower assembly profile 51
52 Upper assembly profile in the frame element 5 for receiving an assembly block which can be connected to a carriage guided in a rail
7 Locking wedges
8 Adjusting tool
9 Tool for driving in the wedges 7

The invention claimed is:

1. A device for adjustable mounting of a separation element to a frame element having a lower assembly profile, wherein the separation element comprises two glass panels in face-to-face relationship, each glass panel having at least one mounting recess, said mounting recesses being substantially co-located but typically not in perfect registration with one another, the device comprising:
two outer eccentric elements, each disposed in a corresponding recess, said outer eccentric elements each having an eccentrically disposed opening, each of said openings having an identical diameter and being substantially smooth through an entirety of the opening, such that when said outer eccentric elements are rotated relative to each other, said two openings may be aligned in coaxial registration;
an inner eccentric element comprising a cylindrical shaft having a substantially smooth, external surface dimensioned to be slidingly inserted in said two openings of said outer eccentric elements when said openings are aligned, and to allow sliding movement in a direction substantially parallel to the axis of said shaft, between said shaft and said outer eccentric elements when said device is deployed;
said shaft further comprising an eccentric bore that receives an anchoring pole therein.

2. A device as claimed in claim 1, wherein said inner eccentric element further comprises a coupling element on at least one side of said shaft.

3. A device according to claim 1, wherein said anchoring pole comprises a grooved or toothed central portion, and wherein said bore is provided with corresponding grooves or teeth, for engaging with the grooves or teeth of the anchoring pole.

4. A device according to claim 1, wherein said anchoring pole comprises a grooved or toothed central portion, and wherein said bore is provided with corresponding grooves or teeth, for engaging with the grooves or teeth of the anchoring pole when load is applied to said anchoring pole.

5. A device as claimed in claim 3, wherein said central portion is dimensioned to have a clearance from the inner surface of said bore, said clearance being provided for allowing said inner eccentric element to be rotated about said anchoring pole.

6. A device as claimed in claim 1 wherein the inner and the outer eccentric elements and the anchoring pole are produced from plastic or from metal.

7. A device as claimed in claim 1, wherein:
said anchoring pole further comprises two anchor pins, each disposed on opposite ends thereof for engaging oppositely disposed grooves within the lower assembly profile.

8. A device as claimed in claim 7, wherein at least one of said anchoring pins comprises two oppositely disposed segments, each having a plane surface.

9. A separation element comprising two glass panels in face-to-face relationship, each glass panel having at least one mounting recess, said mounting recesses being substantially co-located but typically not in perfect registration with one another, the separation element comprising:
a frame element having a lower assembly profile, said profile having opposing grooves;
an anchoring pole having a central portion, and two anchor pins, each disposed on opposite ends thereof and engaged in a corresponding groove for supporting the separation element;
two outer eccentric elements, each disposed in a corresponding recess, said outer eccentric elements each having an eccentrically disposed opening, each of said openings having an identical diameter and being substantially smooth through an entirety of the opening;
an inner eccentric element comprising a cylindrical shaft having a substantially smooth, external surface dimensioned to be slidingly inserted in said two openings of the outer eccentric elements, which are aligned in coaxial registration, so as to allow sliding movement in a direction substantially parallel to the axis of said shaft, between said shaft and said outer eccentric elements;
said shaft further comprising an eccentric bore holding said central portion of said anchoring pole therein.

10. A separation element as claimed in claim 9, wherein said separation element is a composite safety glass panel, having a film disposed between said glass panels, said film having an imprint thereupon.

11. A separation element as claimed in claim 9 further comprising an upper assembly profile disposed above said lower assembly profile and coupled thereto, for coupling said separation element to at least one carriage in a running rail.

12. A separation element comprising a frame element having a lower assembly profile, two glass panels in face-to-face relationship, wherein each glass panel has at least one mounting recess, said mounting recesses being substantially co-located but typically not in perfect registration with one another, and a device for adjustable mounting of the glass panels to said frame element, the device comprising:

two outer eccentric elements, each disposed in a corresponding recess, said outer eccentric elements each having an eccentrically disposed opening, each of said openings having an identical diameter and being substantially smooth through an entirety of the opening, such that when said outer eccentric elements are rotated relative to each other, said two openings may be aligned in coaxial registration;

an inner eccentric element comprising a cylindrical shaft having a substantially smooth, external surface dimensioned to be slidingly inserted in said two openings of said outer eccentric elements when said openings are aligned, and to allow sliding movement in a direction substantially parallel to the axis of said shaft, between said shaft and said outer eccentric elements when said device is deployed, said shaft further comprising an eccentric bore that receives an anchoring pole therein;

at least one wedge introduced between the outer side of said separation element and an adjacent side of said assembly profile, for holding the panel stably within said assembly profile.

13. A device as claimed in claim 12, wherein said separation element is a composite safety glass panel, having a film disposed between said glass panels, said film having an imprint thereupon.

* * * * *